United States Patent
Noda

(10) Patent No.: US 8,129,977 B2
(45) Date of Patent: Mar. 6, 2012

(54) REFERENCE VOLTAGE GENERATING CIRCUIT AND DC-DC CONVERTER INCLUDING THE SAME

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 397 days.

(21) Appl. No.: 12/479,056

(22) Filed: Jun. 5, 2009

(65) Prior Publication Data

US 2009/0309563 A1   Dec. 17, 2009

(30) Foreign Application Priority Data

Jun. 11, 2008   (JP) .................. 2008-152530

(51) Int. Cl.
G05F 3/08 (2006.01)
(52) U.S. Cl. ...................... 323/314; 323/281
(58) Field of Classification Search .......... 323/314, 323/281, 313, 315–317
See application file for complete search history.

(56) References Cited

U.S. PATENT DOCUMENTS

| | | | | |
|---|---|---|---|---|
| 6,310,467 B1 * | 10/2001 | Sauer | ...................... | 323/273 |
| 6,504,350 B2 * | 1/2003 | Leonowich | ................... | 323/281 |
| 2006/0197516 A1 * | 9/2006 | Chiu et al. | ................... | 323/282 |
| 2007/0001513 A1 | 1/2007 | Noda | | |
| 2009/0066306 A1 | 3/2009 | Noda | | |

FOREIGN PATENT DOCUMENTS

| | | |
|---|---|---|
| JP | 2005-333523 | 12/2005 |
| JP | 2006-350722 | 12/2006 |
| JP | 2007-11709 | 1/2007 |
| JP | 2007-249384 | 9/2007 |
| JP | 2007-249523 | 9/2007 |
| JP | 2007-304716 | 11/2007 |
| JP | 2008-177330 | 7/2008 |
| JP | 2008-199804 | 8/2008 |
| JP | 2008-4038 | 10/2008 |

* cited by examiner

*Primary Examiner* — Harry Behm
(74) *Attorney, Agent, or Firm* — Cooper & Dunham LLP

(57) ABSTRACT

A reference voltage generator includes a reference voltage generating circuit that outputs a second reference voltage; and a DA converter that DA-converts a digital signal from outside in accordance with the second reference voltage. The circuit includes a first constant voltage circuit that operates on a DC voltage and outputs a first constant voltage; a second voltage divider that divides the first constant voltage at a second dividing ratio and outputs a second partial voltage; an output transistor that operates on the DC voltage and allows current to flow therethrough according to a signal applied to its control electrode; a current-voltage converter that converts the current from the output transistor into a voltage and outputs the voltage (second reference voltage); and a second op-amplifier that operates on the first constant voltage and controls the output transistor so that the second reference voltage equals to the second partial voltage.

3 Claims, 5 Drawing Sheets

REFERENCE VOLTAGE GENERATING CIRCUIT AND DC-DC CONVERTER INCLUDING THE SAME

BACKGROUND OF THE INVENTION

1. Technical Field

This disclosure relates to a reference voltage generator employing a Digital to Analog (DA) converter and an output voltage variable DC-DC converter including the reference voltage generator, and more specifically, to a circuit that generates a reference voltage to be supplied to the DA converter.

2. Description of the Related Art

FIG. 1 is a schematic block diagram of a conventional commonly-used reference voltage section employing a tracking DA converter (see, Japanese Patent Application Laid-Open Publication No. 2005-333523).

Referring to FIG. 1, a reference voltage generator 100 includes a reference voltage generating circuit 110 and a DA converter 120. The DA converter 120 includes a setting voltage register 121, a digital comparator 122, an up/down counter 123, a code-voltage conversion circuit 124, and an AND circuit 125. In addition, the reference voltage generator 100 receives a voltage setting signal Voset and a clock signal CLK, generates a reference voltage Vdao in accordance with the voltage setting signal Voset, and outputs the generated reference voltage Vdao.

The setting voltage register 121 stores the voltage setting signal Voset, which is a digital signal, output from a control circuit (not shown) and outputs as an output code signal a signal value of the voltage setting signal Voset to a digital comparator 122. The up/down counter 123 counts the number of the clock signals CLK input through the AND circuit 125, outputs as an output code signal the count result to the digital comparator 122 and the code-voltage conversion circuit 124. In addition, the up/down counter 123 carries out up-counting or down-counting in accordance with an up/down signal Su/Sd received from the digital comparator 122.

The digital comparator 122 compares the output code signal from the setting voltage register 121 and the output code signal from the up/down counter 123. When the output code signals are the same, the digital comparator 122 outputs a low level signal as an output signal DCout. When the output codes are different, the digital comparator 122 outputs a high level signal as the output signal DCout. In addition, the digital comparator 122 outputs a down signal Sd so that the count value of the up/down counter 123 is decreased, when the output code signal from the up/down counter 123 is greater than the output code signal from the setting voltage register 123. On the other hand, the digital comparator 122 outputs an up signal Su so that the count value of the up/down counter 123 is increased, when the output code signal from the up/down counter 123 is smaller than the output code signal from the setting voltage register 123.

The code-voltage conversion circuit 124 converts the output code signal output from the up/down counter 123 into a voltage and outputs the voltage. This output voltage is the reference voltage Vdao, which is an output voltage from the reference voltage generator 100.

The code-voltage conversion circuit 124 may be configured with N resisters (N: a positive integer) having a resistance value of R and N+1 resisters having a resistance value of 2R that are connected in a ladder configuration, as shown in FIG. 2. Alternatively, the code voltage conversion circuit 124 may be formed with N resisters having a resistance value R that are connected in series between an output terminal of the reference voltage generating circuit 110 (at the reference voltage Vrt) and the ground terminal GND, as shown in FIG. 3. The code voltage conversion circuits 124 shown in FIGS. 2 and 3 control switches S0 through SN in accordance with the output code signal from the up/down counter 123 in order to change a dividing ratio for dividing the reference voltage Vrt output from the reference voltage generating circuit 110, thereby generating the reference voltage Vado. Namely, the reference voltage generating circuit 110 generates and provides the code-voltage conversion circuit 124 with the reference voltage Vrt that is to be used by the code-conversion circuit 124 in order to generate the reference voltage Vado.

However, every time the output code signals of the up/down counter 123 are changed, noise is caused in the reference voltage Vrt output from the reference voltage generating circuit 110, and it takes a relatively long time until the reference voltage Vrt is stabilized, which results in a slow DA conversion. Namely, when the clock signal CLK is input to the up/down counter 123 and the output code signals of the up/down counter 123 are changed, several switches among the switches S0 through SN are operated. At this moment, a current iccd flowing from the reference voltage generating circuit 110 to the code-voltage conversion circuit 124 is relatively largely fluctuated. The magnitude of the fluctuation varies depending on the number of the switches that operate at a time and whether the switches are turned on or off.

The current iccd is also a load current for the reference voltage generating circuit 110. Because the reference voltage generating circuit 110 is generally provided in an integrated circuit (IC) and occupies a narrow area in the IC, a large current cannot flow through the reference voltage generating circuit 110. In addition, the reference voltage generating circuit 110 cannot respond to a quick change in the current iccd, because the reference voltage generating circuit 110 is designed in order to reduce consumption current as much as possible. Therefore, there is a problem in that quick and great changes in the current iccd leads to quick and great changes in the reference voltage Vrt.

Moreover, when the above reference generator is used in a DC-DC converter that employs an output voltage of the DA converter as the reference voltage and dynamically changes the output voltage by changing the reference voltage in accordance with the voltage setting signal from the control circuit, it takes a relatively long time until the reference voltage is stabilized at a target voltage after the reference voltage is changed in accordance with the voltage setting signal. Namely, there is a problem in that the output voltage of the DC-DC converter cannot be quickly changed.

Furthermore, an output current capacity in the reference voltage generating circuit 110 needs to be increased in order to eliminate the influence on the reference voltage Vrt from the changes in the current iccd. Additionally, a bias current to be used in an inner circuit needs to be increased in order to improve a response speed. However, such countermeasures cause problems in terms of a larger circuit area, which leads to an increased chip size, and a large consumption current.

BRIEF SUMMARY

In an aspect of this disclosure, there is provided a reference voltage generator that employs a DA converter that can change a reference voltage to be generated, in accordance with a signal received from an outside circuit, and a DC-DC converter including the reference voltage generator, both of which are capable of accurately generating a desired reference voltage even when a value of the generated voltage is changed, and reducing an increase in a circuit area and a consumption current In another aspect, there is provided a variable output voltage reference voltage generator that includes a reference voltage generating circuit that generates a predetermined second reference voltage and outputs the generated second reference voltage; and a digital to analog converter that performs digital to analog conversion for a digital signal input from outside in accordance with the second reference voltage and outputs a voltage obtained through the conversion as a first reference voltage. The reference voltage generating circuit includes a first constant voltage circuit that operates on a power source voltage supplied from a direct current power source in order to generate a predetermined first constant voltage and outputs the generated first constant voltage; a second voltage divider circuit that divides the first constant voltage at a second dividing ratio and outputs an obtained partial voltage as a second partial voltage; an output transistor that operates on a power source voltage supplied from the direct current power source and allows a current to flow through the output transistor in accordance with a signal applied to a control electrode of the output transistor; a current-voltage converter circuit that converts the current from the output transistor into a voltage and outputs the voltage as a second reference voltage; and a second operational amplifying circuit that operates on the first constant voltage and controls the output transistor so that the second reference voltage is equal to the second partial voltage.

In another aspect, there is provided a reference voltage generator that employs a DA converter that can change a reference voltage to be generated, in accordance with a signal received from an outside circuit, and a DC-DC converter including the reference voltage generator, both of which are capable of accurately generating a desired reference voltage even when a value of the generated voltage is changed, and reducing an increase in a circuit area and a consumption current.

DETAILED DESCRIPTION OF THE PREFERRED EMBODIMENTS

Referring to the accompanying drawings, embodiments of the present invention will be described.

Figure 4:
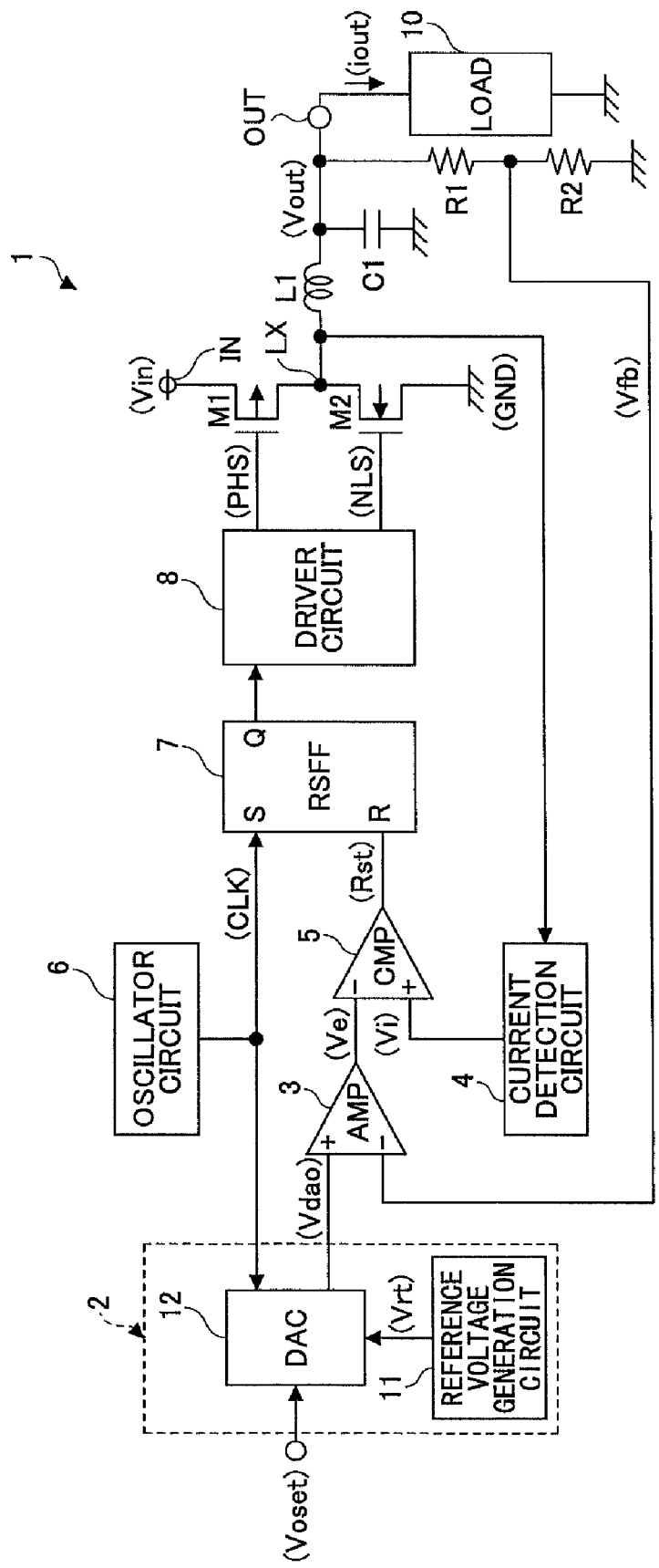
FIG. 4 illustrates an example of a switching regulator employing a reference voltage generator according to an embodiment of the present invention.

FIG. 4 illustrates an example of a switching regulator that employs a reference voltage generator according to an embodiment of the present invention.

A switching regulator 1 in FIG. 4 serves as a DC-DC converter in which an input voltage Vin input to an input terminal IN is reduced to a predetermined constant voltage, which in turn is output as an output voltage Vout to a load 10 from an output terminal OUT. In other words, the switching regulator 1 is provided as a voltage reducing switching regulator of a current mode control type.

The switching regulator 1 includes a switching transistor M1 that performs a switching operation, a synchronous rectifying transistor M2, an inductor L1, an output capacitor (smoothing capacitor) C1, and resisters R1, R2 that divide the output voltage Vout to generate and output a partial voltage Vfb. In this embodiment, the switching transistor M1 is a p-type Metal Oxide Semiconductor (PMOS) transistor and the synchronous rectifying transistor M2 is an n-type Metal Oxide Semiconductor (NMOS) transistor. The switching regulator 1 also includes a reference voltage generator 2 that generates and outputs a predetermined first reference voltage Vdao; an error amplifier 3 that amplifies a voltage difference between the first reference voltage Vdao and the partial voltage Vfb, thereby generating and outputting an error voltage Ve; a current detection circuit 4 that detects a current iL flowing through the inductor L1 and converts the current iL into a voltage, thereby outputting the converted voltage; and a comparator 5 that compares the current detection voltage Vi, which is the output voltage from the current detection circuit 4, and the error voltage Ve.

The switching regulator 1 further includes an oscillation circuit 6 that generates and outputs a predetermined clock signal CLK, an RS flip-flop 7 that is set with the clock signal CLK and reset with an output signal Rst from the comparator 5, and a driver circuit 8 that generates a control signal PHS for causing the switching transistor M1 to perform switching control and a control signal NLS for causing the synchronous rectifying transistor M2 to perform switching control in accordance with a signal output from an output terminal Q of the RS flip-flop 7, and outputs the control signals PHS and NLS to the transistors M1 and M2, respectively. The reference voltage generator 2 includes a reference voltage generating circuit 11 that generates and outputs a predetermined second reference voltage Vrt to be used when DA conversion is performed, and a DA converter 12 that uses the second reference voltage Vrt to perform the DA conversion.

In the switching regulator 1, circuit elements except for the inductor L1 and the output capacitor C1 may be integrated into one IC. Alternatively, circuit elements except for the switching transistor M1 and/or the synchronous rectifying transistor M2, the inductor L1, and the output capacitor C1 may be integrated into one IC, depending on circumstances.

The switching transistor M1 and the synchronous rectifying transistor M2 are connected in series between the input terminal IN and the ground terminal GND. The inductor L1 is connected between the output terminal OUT and a connection node LX of the switching transistor M1 and the synchronous rectifying transistor M2. The output capacitor C1 and a series circuit of the resisters R1, R2 are connected in parallel between the output terminal OUT and the ground terminal GND. The partial voltage Vfb that is a voltage at a connection point of the resisters R1, R2 is input to the inverting input terminal of the error amplifier 3, and the first reference voltage Vdao is input to the non-inverting input terminal of the error amplifier 3. In addition, the error voltage Ve from the error amplifier 3 is input to the inverting input terminal of the comparator 5, and the current detection voltage Vi from the current detection circuit 4 is input to the non-inverting input terminal of the comparator 5.

In the RS flip-flop 7, an input terminal S is connected to the oscillator circuit 6, so that the RS flip-flop 7 receives the clock signal CLK from the oscillator circuit 6, and a reset input terminal R is connected to the output terminal of the comparator 5, so that the RS flip-flop 7 receives the output signal Rst from the comparator 5. An output terminal Q of the RS flip-flop 7 is connected to the driver circuit 8, so that the RS flip-flop 7 outputs a signal to the driver circuit 8. The driver circuit 8 receives the signal from the RS flip-flop 7, generates the control signals PHS and NLS in accordance with the signal, and outputs the control signals PHS and NLS to gates of the switching transistor M1 and the synchronous rectifying transistor M2, respectively.

In the reference voltage generator 2, the DA converter 12 receives the second reference voltage Vrt from the reference voltage generating circuit 11, the clock signal CLK from the oscillator circuit 6, and a voltage setting signal Voset from an outside circuit. Then, the DA converter 12 generates the first reference voltage Vdao in accordance with the voltage setting signal Voset, and outputs the first reference voltage Vdao.

According to the above configuration, the error amplifier 3 amplifies a voltage difference between the partial voltage Vfb and the first reference voltage Vdao and generates and outputs the error voltage Ve. The comparator 5 compares the error voltage Ve and the current detection voltage Vi from the current detection circuit 4, and generates a reset pulse signal Rst corresponding to the comparison result, and outputs the reset pulse signal Rst to the reset input terminal R of the RS flip-flop 7. The comparator 5 outputs a low level signal as the reset pulse signal Rst when the current detection voltage Vi is lower than or equal to the error voltage Ve. In this case, the RS flip-flop 7 outputs from the output terminal Q a high level signal when the clock signal CLK is at a high level, and a low level signal when the clock signal CLK is at a low level.

When the high level signal is output from the output terminal Q of the RS flip-flop 7, the driver circuit 8 outputs low level control signals as the control signals PHS and NLS to the corresponding gates of the transistors M1 and M2. As a result, the switching transistor M1 is turned on and the synchronous rectifying transistor M2 is turned off. Therefore, the input voltage Vin is applied to the series circuit of the inductor L1 and the capacitor C1. Then, the inductor current iL is increased as time passes and thus the current detection voltage Vi is linearly increased. When the inductor current iL exceeds the output current iout, electric charge is accumulated in the output capacitor C1, and thus the output voltage Vout is increased.

On the other hand, when the low level signal is output from the output terminal Q of the RS flip-flop, the driver circuit 8 outputs the high level control signals as the control signals PHS and NLS to the corresponding gates of the transistors M1 and M2. As a result, the switching transistor M1 is turned off and the synchronous rectifying transistor M2 is turned on. Therefore, energy stored by the inductor L1 is discharged, and the inductor current iL is linearly reduced as time passes. When the inductor current iL falls below the output current iout, electricity is supplied from the output capacitor C1 to the load 10, and thus the output voltage Vout is reduced.

When the current detection voltage Vi exceeds the error voltage Ve, the comparator 5 outputs a high level signal as the reset pulse signal Rst, so that the RS flip-flop 7 is reset. When the reset pulse signal Rst is being input to the reset input terminal R, the RS flip-flop 7 keeps the output terminal Q at a low level regardless of the signal level of the clock signal CLK. Because the driver circuit 8 receives the low level signal from the RS flip-flop 7, the output voltage Vout is reduced in the same manner as described above.

When the output voltage Vout is reduced, the error voltage Ve from the error amplifier 3 is increased. As a result, it takes a relatively long time until the current detection voltage Vi exceeds the error voltage Ve, which leads to an increased ON time of the switching transistor M1, thereby increasing the output voltage Vout. When the output voltage Vout is further increased, the ON time of the switching transistor M1 is reduced, thereby reducing the output voltage Vout. In such a manner, the switching transistor M1 and the synchronous rectifying transistor M2 are complimentarily controlled in accordance with voltage variations, thereby stabilizing the output voltage Vout at a predetermined voltage.

The DA converter 12 uses the clock signal CLK from the oscillator circuit 6 and the second reference voltage Vrt from the reference voltage generating circuit 11, and performs the DA conversion for the voltage setting signal Voset, which is a digital signal, thereby generating the first reference voltage Vdao.

Figure 5:
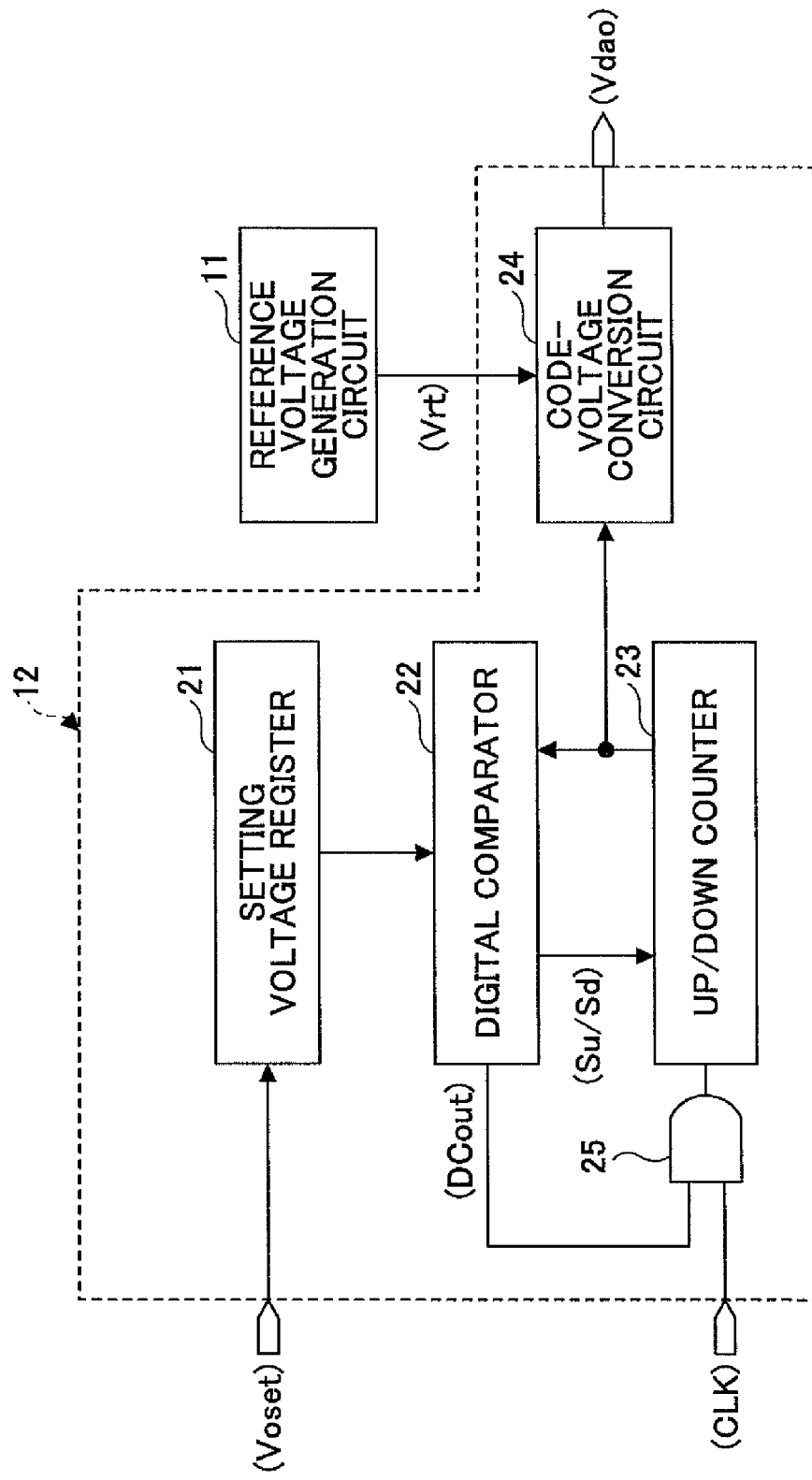
FIG. 5 is a schematic block diagram of a DA converter in the reference voltage generator according to the embodiment of the present invention.

FIG. 5 is a block diagram illustrating the DA converter 12 in the reference voltage generator 2 according to this embodiment of the present invention.

As shown in FIG. 5, the DA converter 12 includes a setting voltage register 21, a digital comparator 22, an up/down counter 23, a code-voltage conversion circuit 24, and an AND circuit 25.

The setting voltage register 21 receives and stores the voltage setting signal Voset, which is a digital signal. The setting voltage register 21 outputs the digital signal as an output code signal to the digital comparator 22. The clock signal CLK from the oscillator signal 6 (FIG. 4) is input to one input terminal of the AND circuit 25. The up/down counter 23 receives the clock signals CLK through the AND circuit 25, counts the number of the clock signals CLK, and outputs the count result as an output code signal to the digital comparator 22 and the code-voltage conversion circuit 24. The up/down counter 23 carries out up-counting or down-counting in accordance with an up signal Su or a down signal Sd received from the digital comparator 22.

The digital comparator 22 compares the output code signal from the setting voltage register 21 and the output code signal from the up/down counter 23. When the output code signals are equal to each other, the digital comparator 22 outputs a low level signal as the output signal DCout to the AND circuit 25. On the other hand, when the output code signals are different, the digital comparator 22 outputs a high level signal as the output signal DCout to the AND circuit 25.

In addition, the digital comparator 22 outputs to the up/down counter 23 a down signal Sd that instructs the up/down counter 23 to perform down counting when the output code signal from the up/down counter 23 is greater than the output code signal from the setting voltage register 21. On the other hand, when the output code signal from the up/down counter 23 is smaller than the output code signal from the setting voltage register 21, the digital comparator 22 outputs to the up/down counter 23 an up signal Su that instructs the up/down counter 23 to perform up counting.

The code-voltage conversion circuit 24 performs the DA conversion for the output code signal output from the up/down counter 23 by use of the second reference voltage Vrt from the reference voltage generation circuit 11, and outputs the resultant voltage, which is the output voltage of the DA converter 12, namely, the first reference voltage Vdao.

Figure 6:
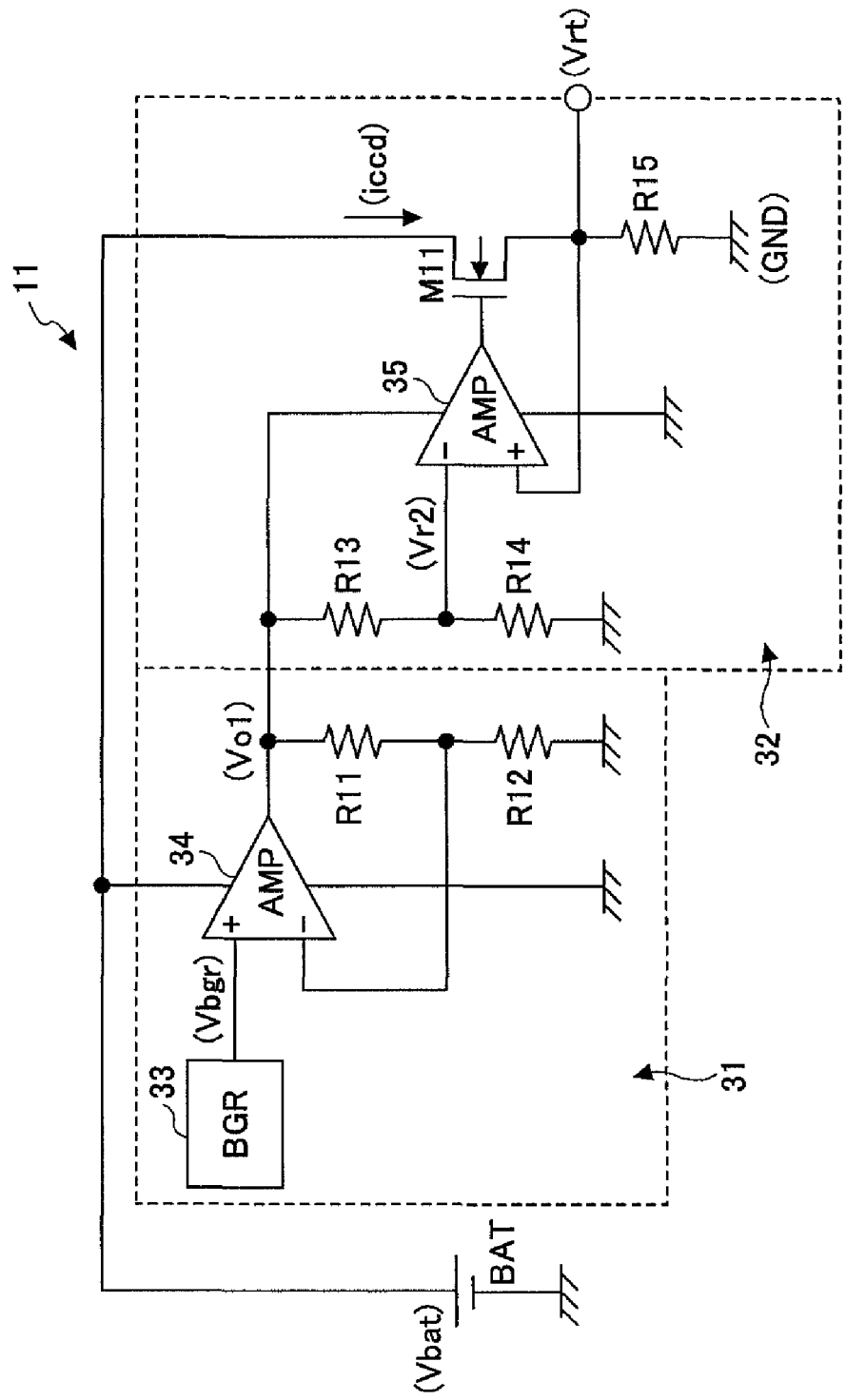
FIG. 6 is a schematic circuit diagram of a reference voltage generating circuit of the reference voltage generator shown in FIG. 5.

FIG. 6 is a schematic circuit diagram of the reference voltage generating circuit 11.

Referring to FIG. 6, the reference voltage generating circuit 11 includes a first constant voltage circuit 31 that generates and outputs a predetermined first voltage Vo1, and a second constant voltage circuit 32 that uses the first constant voltage Vo1 to generate and output the second reference voltage Vrt.

The first constant voltage circuit 31 includes a reference voltage source 33 that generates and outputs a predetermined third reference voltage Vbgr, a first operational amplifier 34, and resistors R11, R12. The second constant voltage circuit 32 includes a second operational amplifier 35, an NMOS transistor M11, and resistors R13 through R15. The resistors R11, R12 serve as a first voltage divider circuit; the resistors R13, R14 serve as a second voltage divider circuit; the NMOS transistor M11 serves as an output transistor; and the resistor R15 serves as a current-voltage converter circuit.

Figure 1:
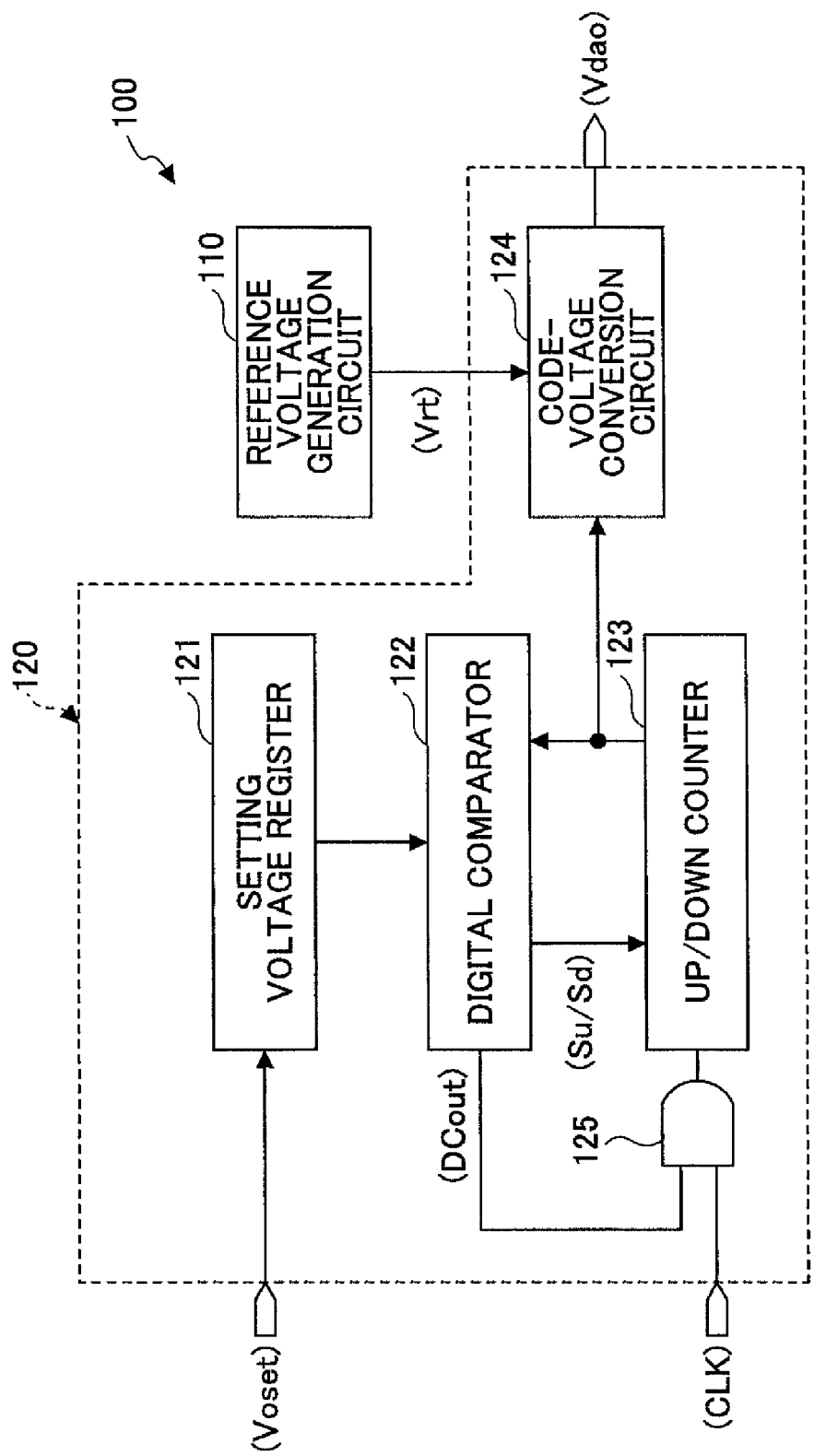
FIG. 1 is a schematic block diagram of a reference voltage generator employing a commonly-used conventional tracking Digital-to-Analog (DA) converter.

The reference voltage source 33 of the first constant voltage circuit 31 serves as the reference voltage generating circuit. For example, the reference voltage source 33 may be a band gap reference (BGR) circuit that utilizes, the energy band gap of, for example, silicon in order to generate and output the third reference voltage Vbgr of about 1.2 V. The reference voltage source 33 is connected to the non-inverting input terminal of the first operational amplifier 31, so that the third reference voltage Vbgr is input to the non-inverting input terminal of the first operational amplifier 34. The resistors R11, R12 are connected in series between an output terminal of the first operational amplifier 34 and the ground terminal. The inverting input terminal of the first operational amplifier 34 is connected to a connection node of the resistors R11, R12. The first operational amplifier 34 operates on a power source voltage Vbat from a DC power source BAT, and outputs the first constant voltage Vo1 from the output terminal. Namely, the first operational amplifier 34 generates and outputs the first constant voltage Vo1 so that a voltage across the resistor R12 is equal to the third reference voltage Vbgr. The DC power source BAT may also be connected to the input terminal IN (FIG. 1) of the switching regulator 1. In other words, the input voltage Vin and the power source voltage Vbat for the first operational amplifier 34 are provided from the DC power source BAT.

In the second constant voltage circuit 32, the resisters R13, R14 are connected in series between the output terminal of the first operational amplifier 34 and the ground terminal in order to divide the first reference voltage Vo1. A connection node between the resisters R13, R14 is connected to the inverting input terminal of the second operational amplifier 35. In addition, the second operational amplifier 35 operates on the first constant voltage Vo1. An output terminal of the second operational amplifier 35 is connected to the gate of the NMOS transistor M11, and the drain of the NMOS transistor M11 is connected to the DC power source BAT. The resistor R15 is connected between the source of the NMOS transistor M11 and the ground terminal. A connection node between the NMOS transistor M11 and the resistor R15 serves as an output terminal of the reference voltage generating circuit 11, and is connected to the non-inverting input terminal of the second operational amplifier 35.

A partial voltage Vr2 obtained by dividing the first constant voltage Vo1 is input to the inverting input terminal of the second operational amplifier 35, and thus the second operational amplifier 35 controls the NMOS transistor M11 so that the second reference voltage Vrt is equal to the partial voltage Vr2. In such a manner, the second operational amplifier 35 can control a current iccd flowing through the NMOS transistor M11. The second reference voltage Vrt is expressed as follows:

$$Vrt = Vr2 = Vo1 \times r14/(r13+r4) \quad (1)$$

where r13 and r14 are resistance values of R13 and R14, respectively.

Figure 2:
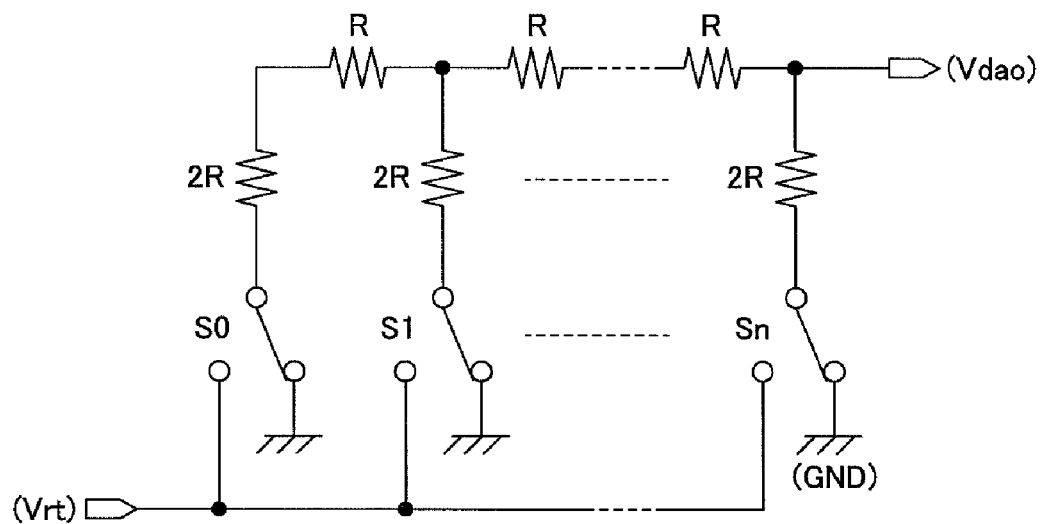
FIG. 2 is a schematic circuit diagram of a code-voltage conversion circuit of the reference voltage generator shown in FIG. 1.
Figure 3:
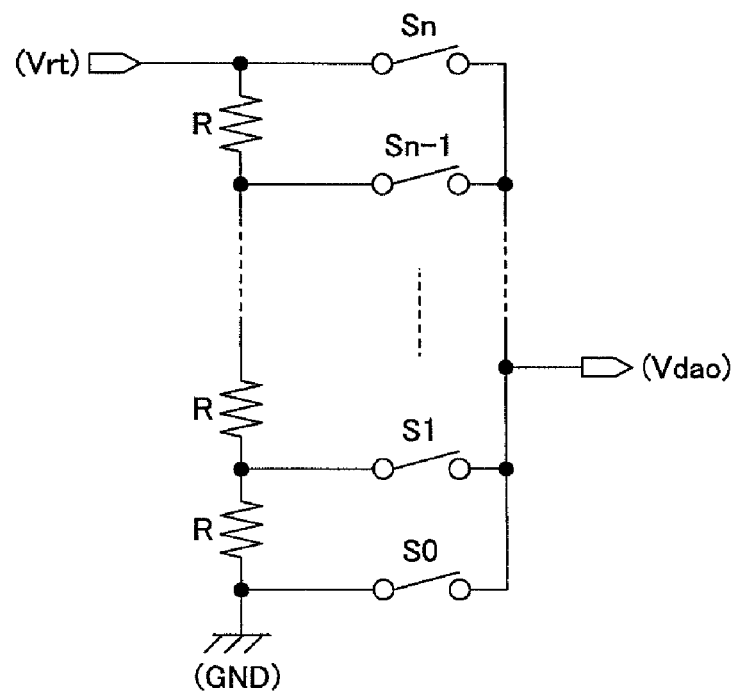
FIG. 3 is another schematic circuit diagram of a code-voltage conversion circuit of the reference voltage generator shown in FIG. 1.

In the reference voltage generating circuit 11 according to this embodiment of the present invention, the DC power source BAT having the output voltage of Vbat is used as a power source for the NMOS transistor M11 as the output transistor of the second constant voltage circuit 32, as stated above. Therefore, when the code-voltage conversion circuit 24 of the DA converter 12 (FIG. 5) has the same circuit configuration as the code-voltage conversion circuit shown in FIG. 2 or FIG. 3, and even if the current iccd flowing through the output transistor of the second constant voltage circuit 32 may be influenced by changes in the output code signal of the up/down counter 23, a load current output from the first constant voltage circuit 31 is hardly changed. This is because the current iccd is directly supplied from the DC power source BAT having a low internal resistance. Therefore, the output voltage of the first constant voltage circuit 31 is hardly changed, and the partial voltage Vr2 generated by the resisters R13, R14 is hardly changed. Accordingly, the second reference voltage Vrt, which is the output voltage of the second constant voltage circuit 32, is stabilized to an extreme degree.

In addition, because the load current output from the first constant voltage circuit 31 is merely a bias current supplied to the second operational amplifier 35 of the second constant voltage circuit 32, a current capacity of an output transistor in the first operational amplifier 34 used in the first constant voltage circuit 31 can be reduced, thereby reducing a chip area when the circuit elements of the switching regulator 1 are integrated into an IC.

Moreover, because the NMOS transistor M11 as the output transistor of the second constant voltage circuit 32 is connected in a source follower configuration, the output impedance of the second constant voltage circuit 32 can be sufficiently reduced, and a response speed of the second constant voltage circuit 32 can be increased. Therefore, changes in the output voltage of the second constant voltage circuit 32 due to the changes of the current iccd can be reduced.

As stated above, because the power source voltage of the NMOS transistor M11 as the output transistor of the second constant voltage circuit 32 is directly supplied from the DC power source having a low internal resistance in the reference voltage generator 2 according to the embodiment of the present invention, changes in the second reference voltage Vrt generated by the reference voltage generating circuit 11 can be reduced even when the output code signals of the up/down counter 23 in the DA converter 12 are changed, thereby enabling a highly accurate high speed DA conversion. In addition, a desired reference voltage can be accurately generated even when the reference voltage to be generated needs to be changed. Moreover, a circuit area and consumption current can be reduced.

Furthermore, when the reference voltage generator 2 according to the embodiment of the present invention is applied to a DC-DC converter, the DC-DC converter provides a quick response even when the output voltage Vout of the DC-DC converter is changed by the voltage setting signal Voset. In other words, the output voltage Vout can be quickly changed.

In the above explanation, although the reference voltage generator according to the embodiment of the present invention is used in the current mode control type voltage-reducing switching regulator, this is merely one example. The present invention is applicable to all types of DC-DC converters such as switching regulators, series regulators, and the like, where the output voltage can be changed by changing the reference voltage output from the reference voltage generator.

The present application is based on Japanese Priority Patent Applications No. 2008-152530, filed on Jun. 11, 2008, the entire content of which is incorporated herein by reference.

What is claimed is:

1. A variable output voltage reference voltage generator comprising:
   a reference voltage generating circuit that generates a predetermined second reference voltage and outputs the generated second reference voltage; and
   a digital to analog converter that performs digital to analog conversion for a digital signal input from outside in accordance with the second reference voltage and outputs a voltage obtained through the conversion as a first reference voltage,
   wherein the reference voltage generating circuit comprises:
      a first constant voltage circuit that operates on a power source voltage supplied from a direct current power source in order to generate a predetermined first constant voltage and outputs the generated first constant voltage,
      a second voltage divider circuit that divides the first constant voltage at a second dividing ratio and outputs an obtained partial voltage as a second partial voltage,
      an output transistor that operates on the power source voltage supplied from the direct current power source and allows a current to flow through the output transistor in accordance with a signal applied to a control electrode of the output transistor,
      a current-voltage converter circuit that converts the current from the output transistor into a voltage and outputs the voltage as a second reference voltage, and
      a second operational amplifying circuit that operates on the first constant voltage and controls the output transistor so that the second reference voltage is equal to the second partial voltage,
   wherein the output transistor comprises a metal oxide transistor in a source follower configuration.

2. The reference voltage generator of claim 1, wherein the first constant voltage circuit comprises
   a reference voltage source that generates a predetermined third reference voltage and outputs the generated third reference voltage;
   a first voltage divider circuit that divides the first constant voltage at a predetermined first dividing ratio and outputs an obtained partial voltage as a first partial voltage; and
   a first operational amplifying circuit that operates on a power source voltage supplied from the direct current power source, generates the first constant voltage so that the first partial voltage is equal to the third reference voltage, and outputs the generated first constant voltage.

3. A variable output voltage reference voltage DC-DC converter that converts an input voltage applied to an input terminal into a predetermined constant voltage and outputs the converted constant voltage as an output voltage, the variable output voltage reference voltage DC-DC converter comprising a reference voltage generator including:
   a reference voltage generating circuit that generates a predetermined second reference voltage and outputs the generated second reference voltage; and
   a digital to analog converter that performs digital to analog conversion for a digital signal input from outside in accordance with the second reference voltage and outputs a voltage obtained through the conversion as a first reference voltage,
   wherein the reference voltage generating circuit comprises:
      a first constant voltage circuit that operates on a power source voltage supplied from a direct current power source in order to generate a predetermined first constant voltage and outputs the generated first constant voltage,
      a second voltage divider circuit that divides the first constant voltage at a second dividing ratio and outputs an obtained partial voltage as a second partial voltage,
      an output transistor that operates on the power source voltage supplied from the direct current power source and allows a current to flow through the output transistor in accordance with a signal applied to a control electrode of the output transistor,
      a current-voltage converter circuit that converts the current from the output transistor into a voltage and outputs the voltage as a second reference voltage, and
      a second operational amplifying circuit that operates on the first constant voltage and controls the output transistor so that the second reference voltage is equal to the second partial voltage,
   wherein the output transistor comprises a metal oxide transistor in a source follower configuration, and
   wherein the output voltage of the DC-DC converter is changed by changing the first reference voltage output from the reference voltage generator and outputs the output voltage from an output terminal of the DC-DC converter.

* * * * *